Aug. 2, 1927.　　　O. G. SCHMITT　　　1,637,623
METHOD OF MAKING CORN PLASTERS
Filed July 13, 1925　　　9 Sheets-Sheet 4

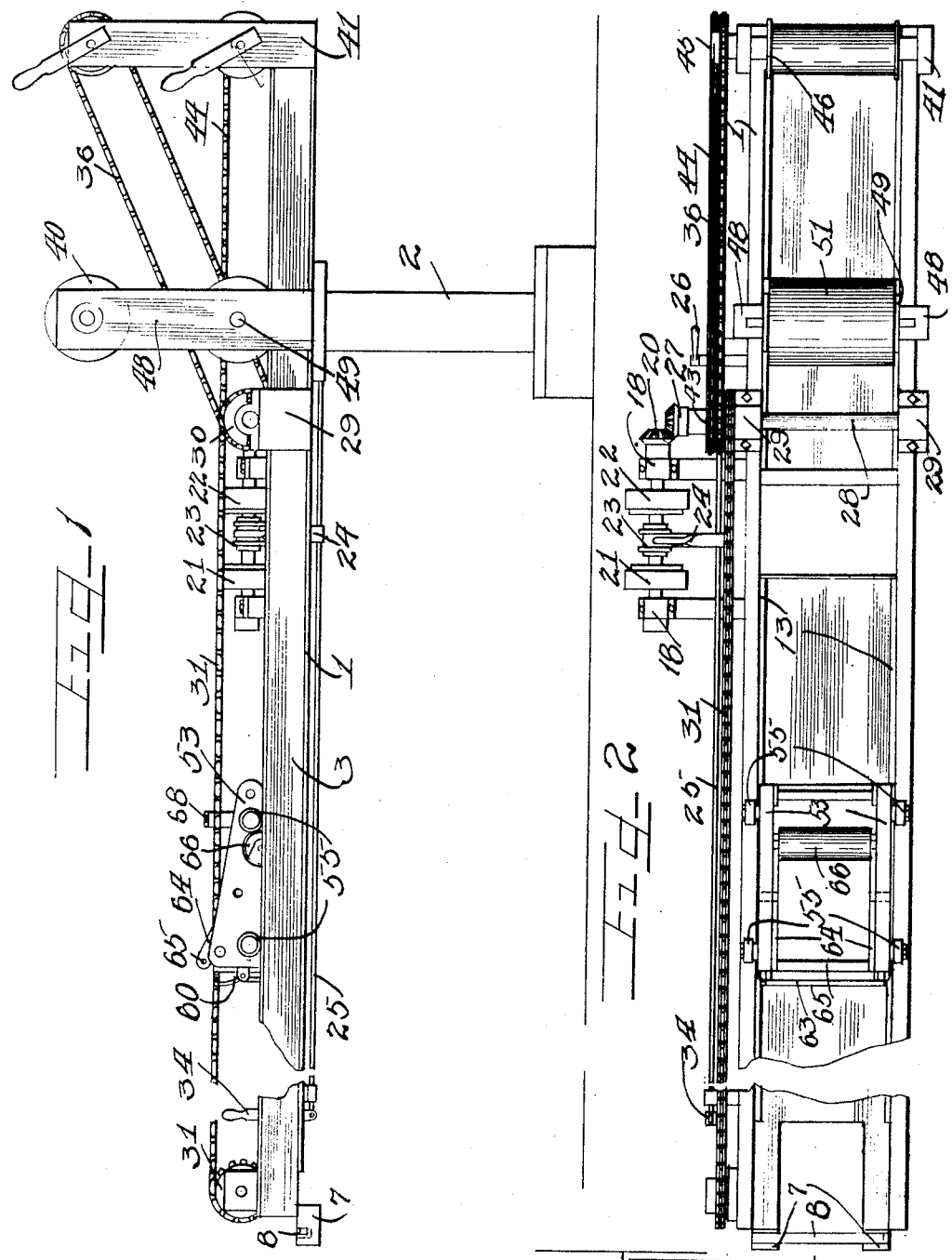

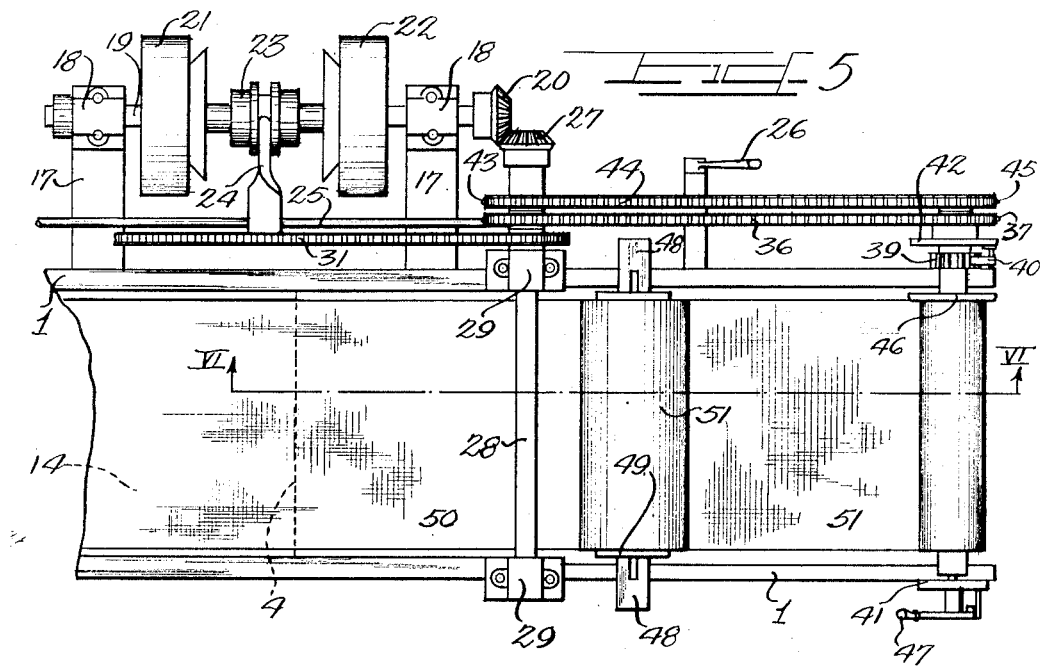

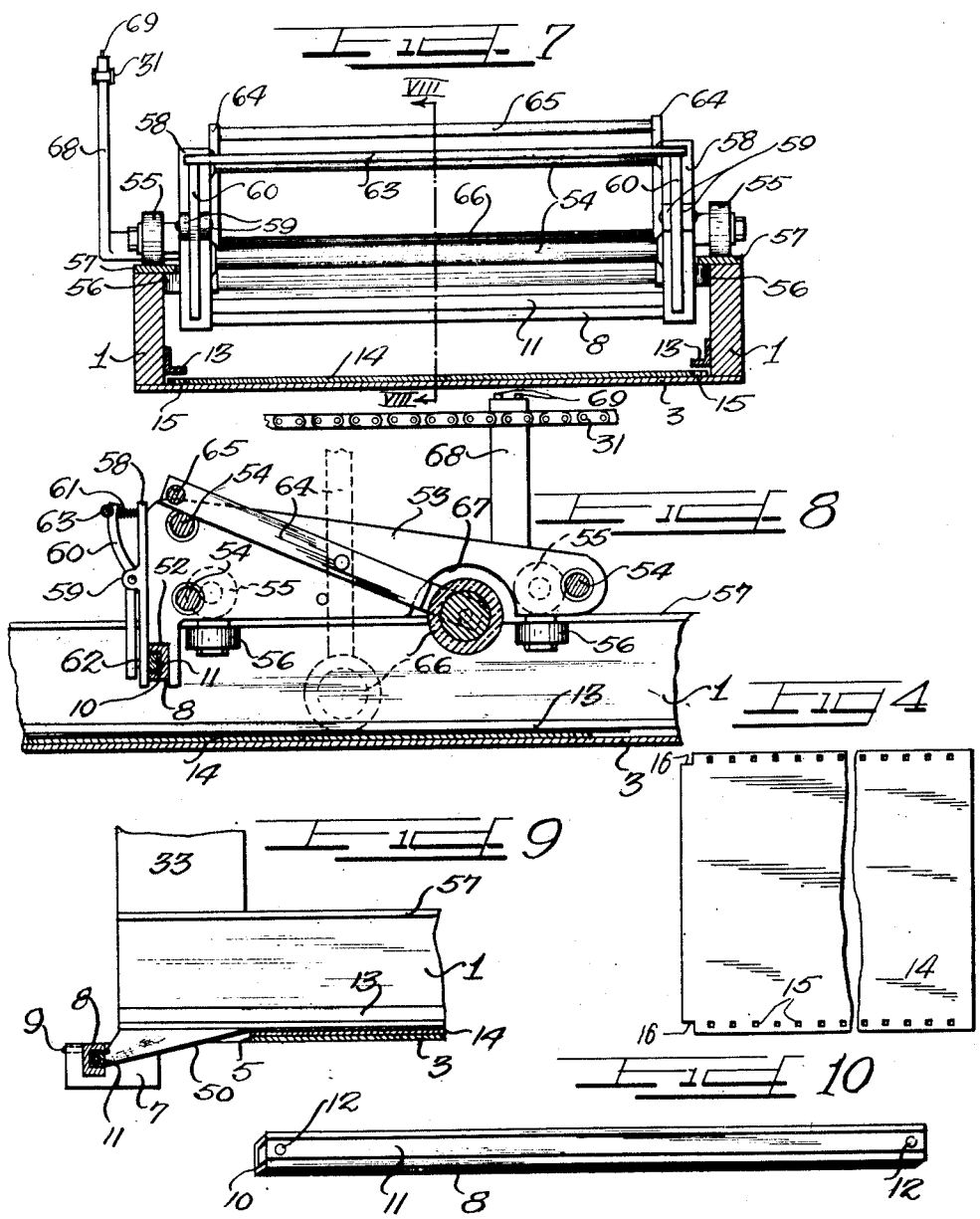

INVENTOR
Otto G. Schmitt
by Charles Mills
Attys

Aug. 2, 1927.
O. G. SCHMITT
1,637,623
METHOD OF MAKING CORN PLASTERS
Filed July 13, 1925
9 Sheets-Sheet 5
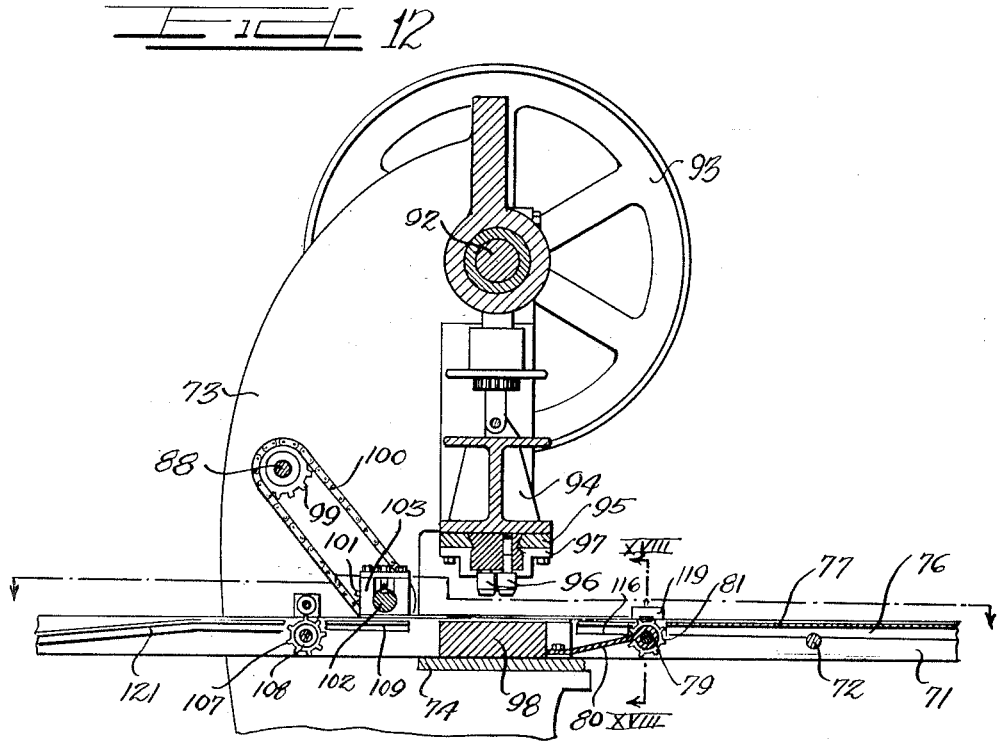
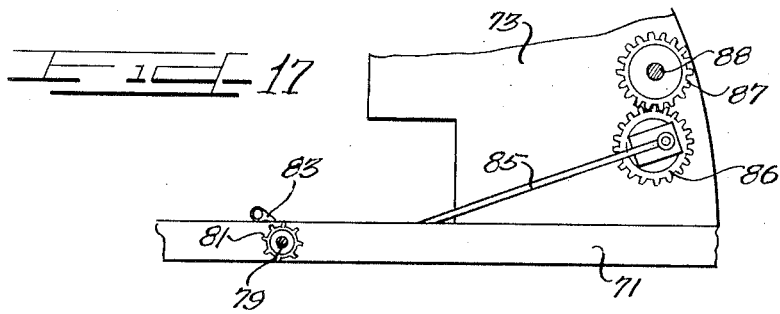
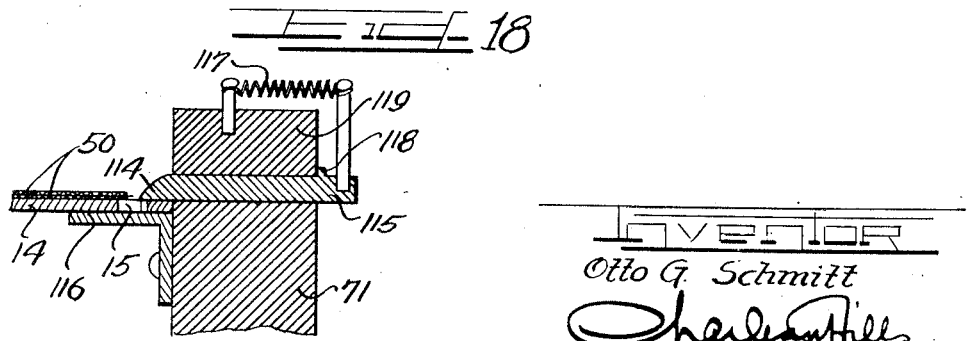
Inventor
Otto G. Schmitt
by Charles Hill
Attys

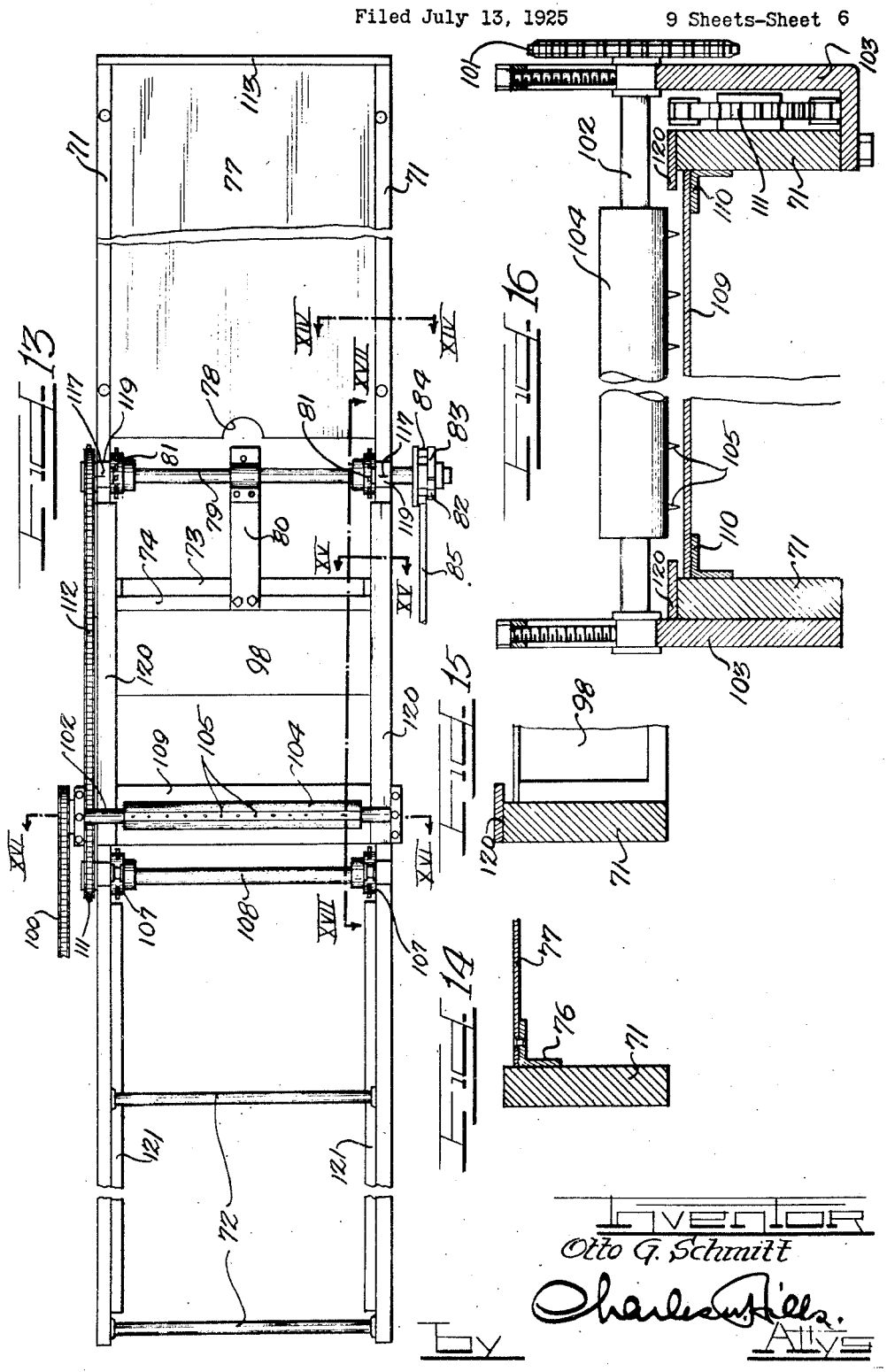

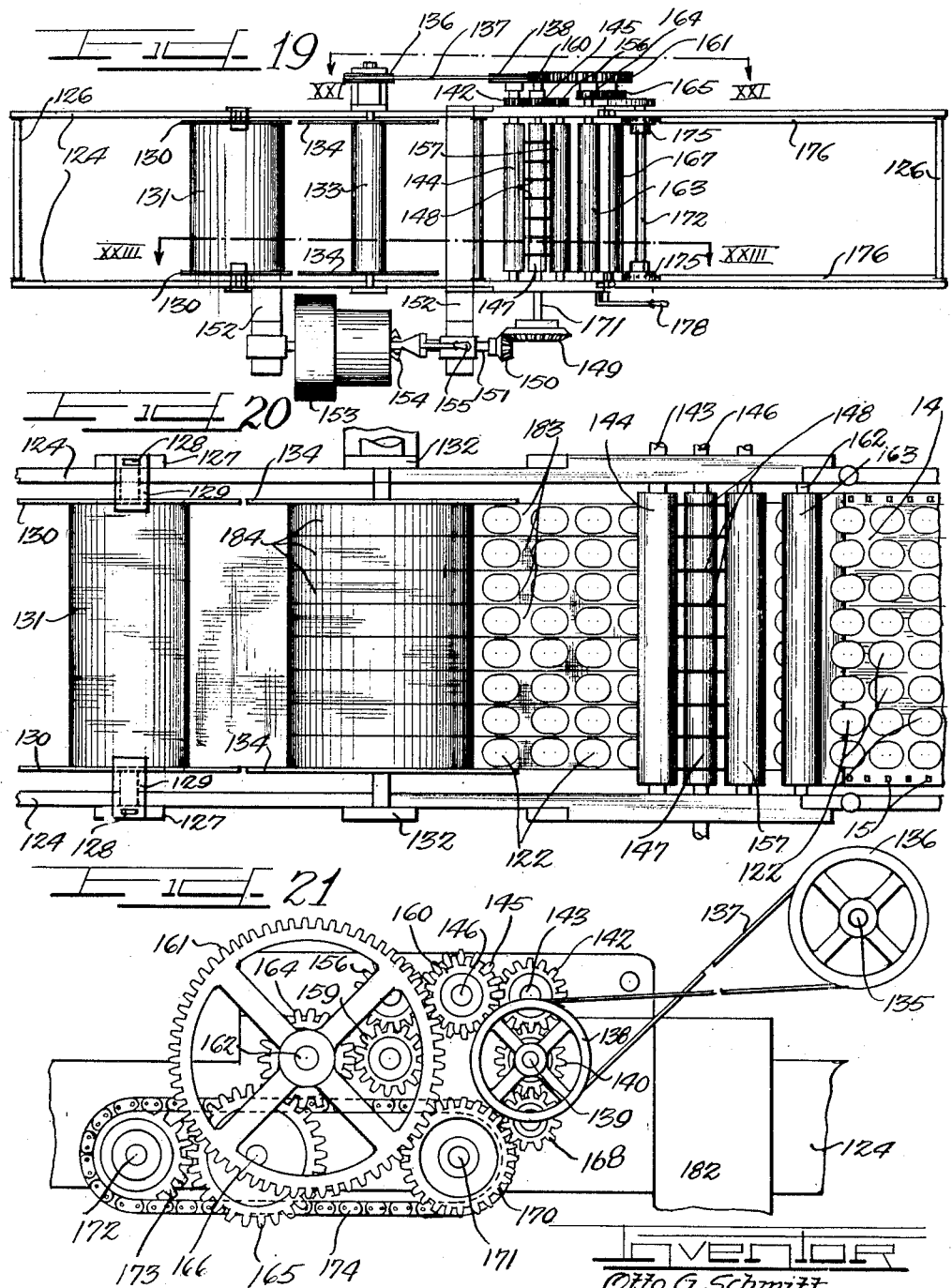

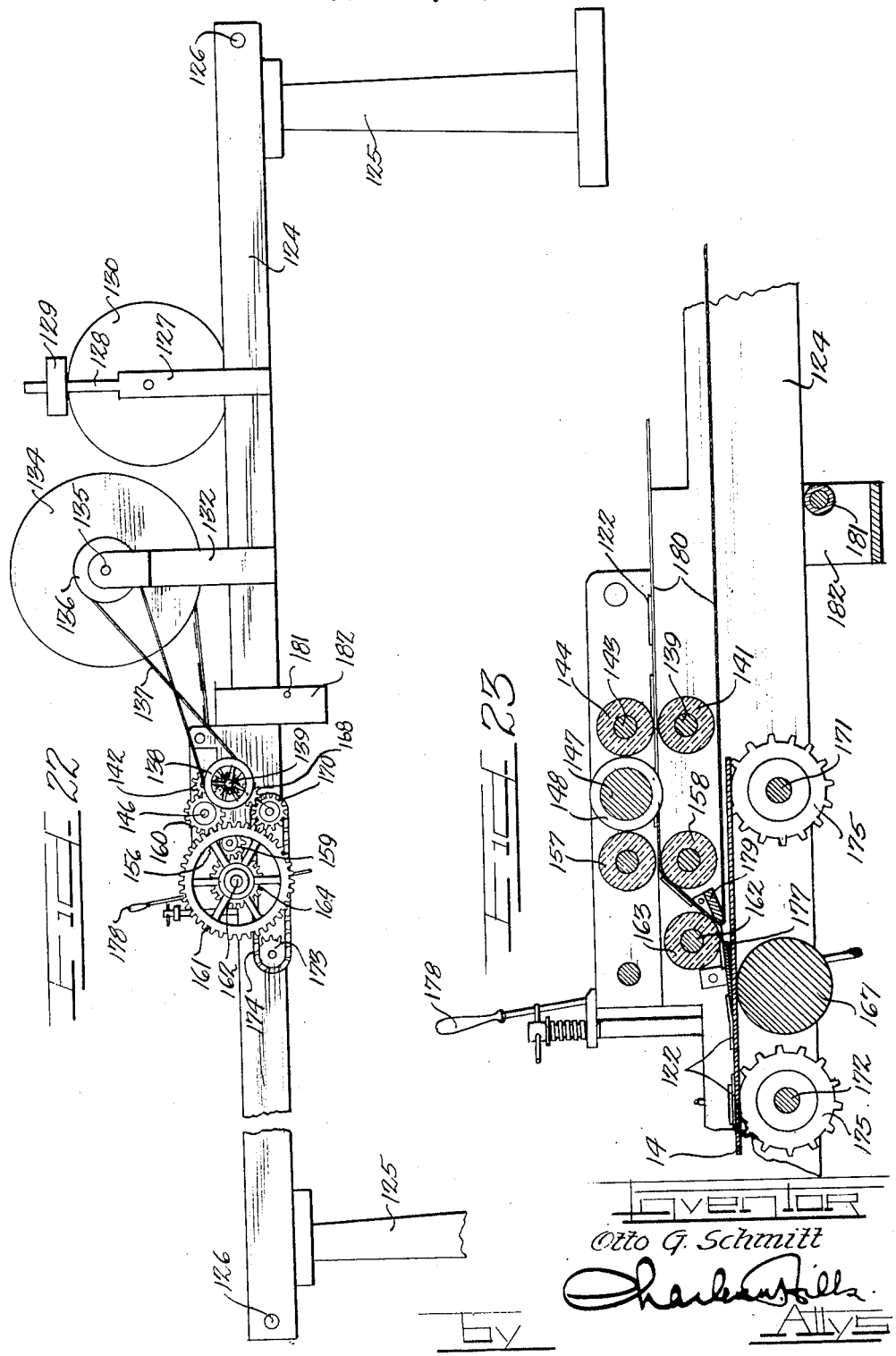

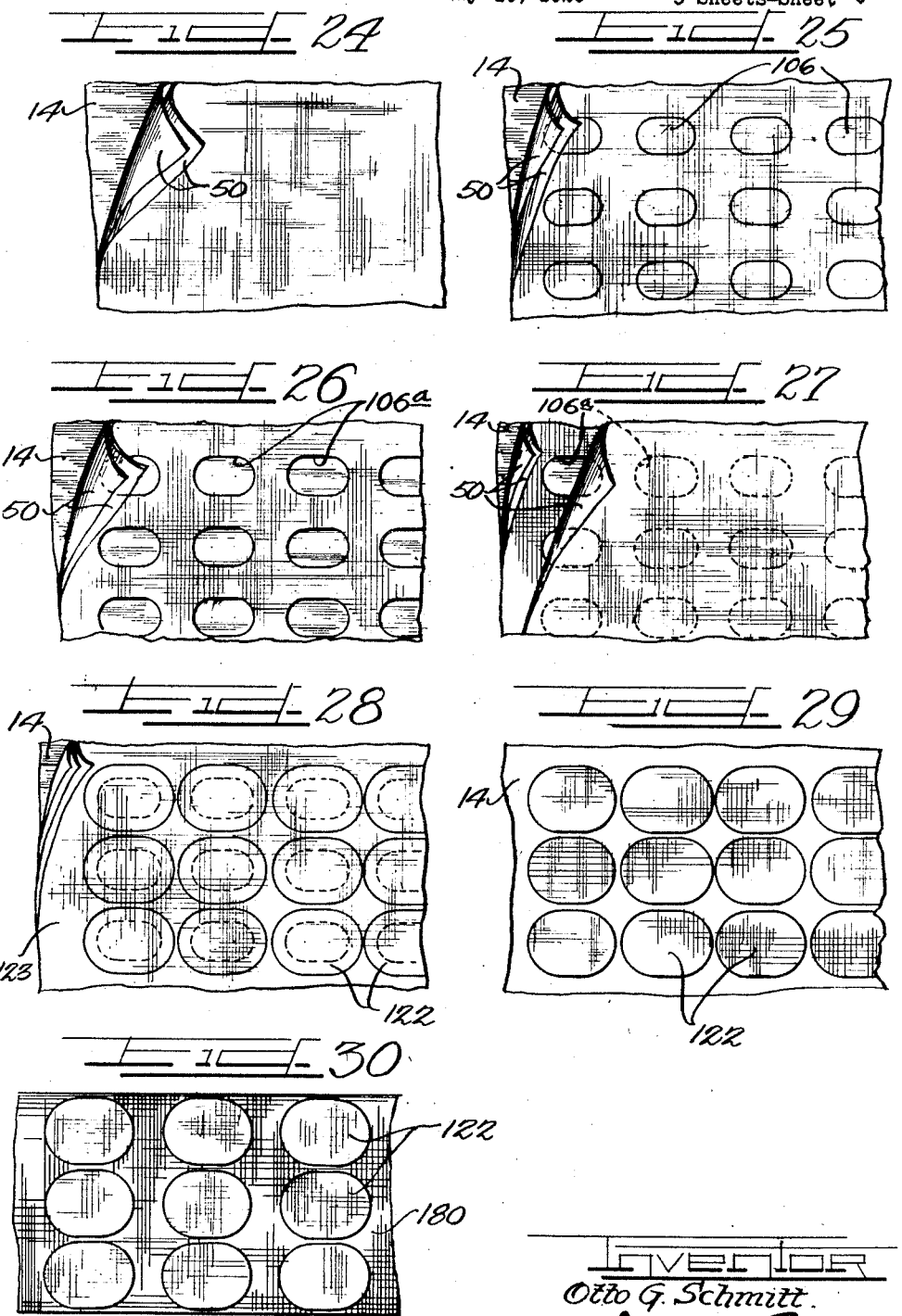

Patented Aug. 2, 1927.

1,637,623

UNITED STATES PATENT OFFICE.

OTTO G. SCHMITT, OF CHICAGO, ILLINOIS, ASSIGNOR TO THE SCHOLL MFG. CO., INC., OF CHICAGO, ILLINOIS, A CORPORATION OF NEW YORK.

METHOD OF MAKING CORN PLASTERS.

Application filed July 13, 1925. Serial No. 43,423.

Heretofore corn plasters have been manufactured by hand, placed on wide bands of gauze or on narrow gauze strips and the completed bands or strips rolled up into rolls, each roll carrying a selected number of corn plasters. The labor involved in the manufacture of corn plasters is considerable and consumes an excessive amount of time, thereby reducing the resultant profits.

This invention relates more particularly to improved machines whereby corn plasters may be automatically produced ready for packing and shipment by an improved method in which the material forming the corn plasters is subjected to a series of operations in different machines, said machines being so placed that the work may be greatly facilitated to permit corn plasters properly positioned on gauze strips to be taken from the machine with said strips properly rolled ready for packing or shipment.

It is an object of this invention to provide an improved machine for automatically producing corn plasters.

It is also an object of this invention to provide an improved method whereby corn plasters may be automatically produced in a short time and at a greatly reduced cost.

It is a further object of this invention to provide a corn plaster machine embracing a plurality of associated machines adapted to be used in a selected order to produce the finished corn plasters properly mounted on narrow strips of gauze.

It is furthermore an object of this invention to provide improved machines for automatically removing adhesived material from a protecting strip, deposit said adhesived material in superimposed layers on abutting plates, after which the plates with the material thereon are subjected to a punch mechanism which cuts out the formed plasters, leaving the same deposited on said plates to permit said plates to be run through a stripping machine which acts to automatically remove the formed corn plasters from said plates and deposit the same in rows on a moving strip of gauze which is cut into gauze strips of narrow width, each containing a row of the corn plasters.

It is an important object of this invention to provide an improved machine and method whereby corn plasters may be automatically manufactured and deposited on narrow strips of gauze adapted to be removed from the machine in rolls ready for packing or shipment, said machines being so related that the material to be formed into corn plasters may be readily subjected to a series of operations leading to the final result desired.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal side elevation of an improved machine for removing the protecting layer of cloth from a rolled sheet of adhesived material and depositing said adhesived material in superimposed layers upon removable plates.

Figure 2 is a top plan view of the machine illustrated in Figure 1.

Figure 3 is an enlarged end elevation of the machine taken on line III—III of Figure 2 with parts omitted.

Figure 4 is an enlarged plan view of one of the apertured plates used in combination with the machine.

Figure 5 is an enlarged fragmentary plan view of the machine taken on line V—V of Figure 1.

Figure 6 is a fragmentary vertical section taken longitudinally of the machine on line VI—VI of Figure 5.

Figure 7 is an enlarged transverse section taken on line VII—VII of Figure 2 showing the travelling carriage in elevation.

Figure 8 is a sectional view taken longitudinally through the carriage on line VIII—VIII of Figure 7.

Figure 9 is an enlarged fragmentary detail section taken on line IX—IX of Figure 3 with parts omitted.

Figure 10 is a perspective view of the material clamping bar shown in Figure 9.

Figure 12 is a vertical section through the punch press machine with parts broken away.

Figure 13 is a fragmentary top plan view of the punch press machine with the punch mechanisms omitted.

Figure 14 is an enlarged fragmentary detail section taken on line XIV—XIV of Figure 13.

Figure 15 is an enlarged fragmentary detailed section taken on line XV—XV of Figure 13.

Figure 16 is an enlarged fragmentary transverse section of the picker mechanism taken on line XVI—XVI of Figure 13.

Figure 17 is an enlarged fragmentary vertical elevation of a part of the punch press mechanism taken on line XVII—XVII of Figure 13 with parts omitted.

Figure 18 is an enlarged fragmentary detail section taken on line XVIII—XVIII of Figure 12 with parts omitted.

Figure 19 illustrates a top plan view of a corn plaster stripping machine embodying a portion of this invention.

Figure 20 is an enlarged fragmentary top plan view of a portion of the stripper machine with parts omitted and showing a fragmentary portion of one of the plaster plates in position to permit corn plasters to be removed therefrom and deposited on strips of gauze.

Figure 21 is an enlarged fragmentary side elevation of the machine taken on line XXI—XXI of Figure 19 showing the gearing arrangement.

Figure 22 is a fragmentary rear side elevation of the stripping machine.

Figure 23 is an enlarged longitudinal vertical section taken on line XXIII—XXIII of Figure 19.

Figure 24 illustrates a fragmentary portion of two layers of the adhesived material superimposed upon a plate.

Figure 25 illustrates a similar view of two superimposed layers of adhesived material after the plate has been put into the punch press machine to cut out portions of the corn plaster material.

Figure 26 is a similar elevational view after the cut-out portions have been picked out and removed from the plate.

Figure 27 shows two strips of superimposed adhesived material on a plate, said strips being punched and having a third layer of the adhesived material applied thereto.

Figure 28 illustrates a fragmentary portion of a plate with three superimposed layers of the adhesived material placed thereon with said layers of material properly punched to form the corn plasters.

Figure 29 shows a fragmentary portion of one of the plates with the waste resultant webbing of the adhesived material removed from the plate leaving only the corn plasters in position in rows.

Figure 30 is a fragmentary portion of the gauze material having a plurality of rows of the finished corn plasters deposited thereon by the stripping machine prior to the cutting of said gauze into narrower strips.

Figure 11:
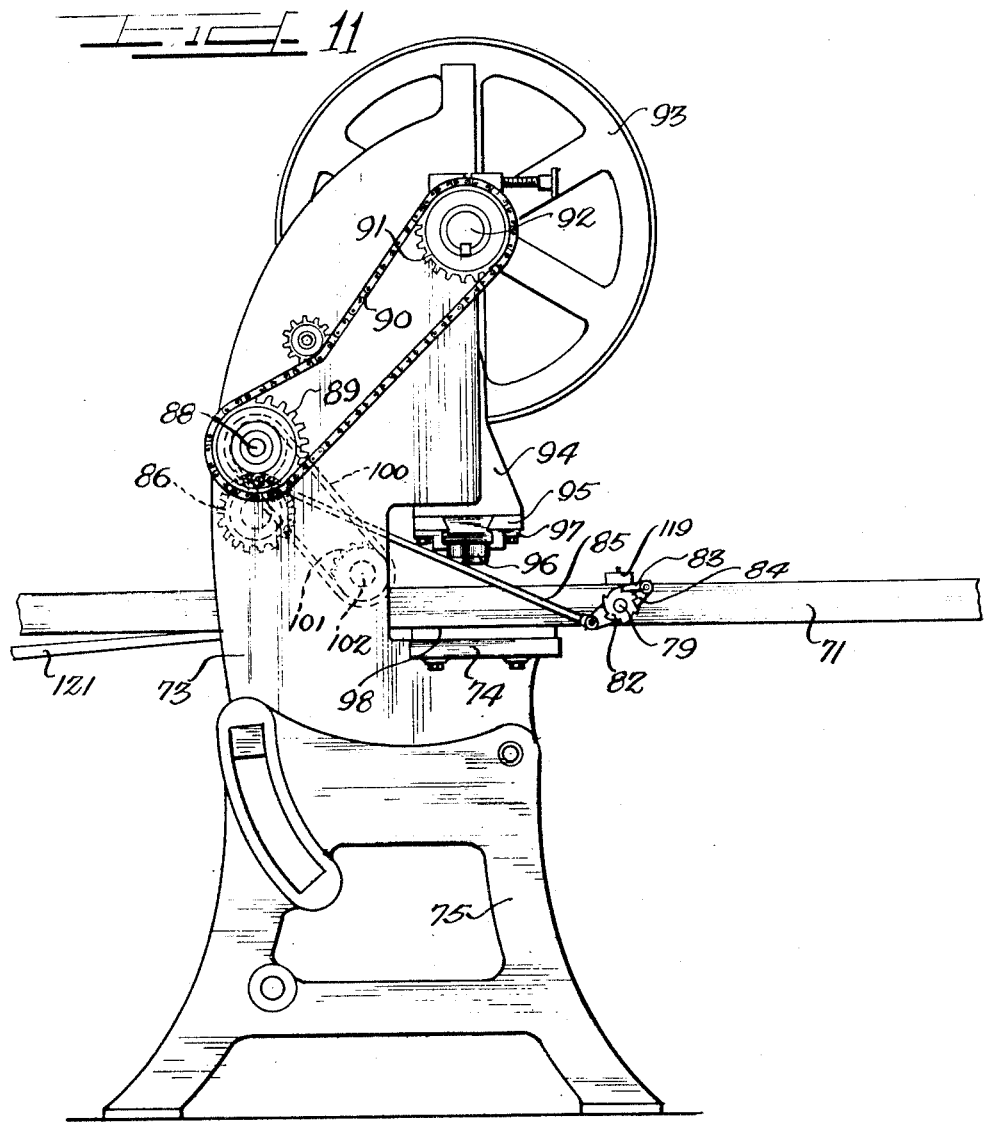
Figure 11 is a fragmentary side elevation of a punch press machine with parts broken away, said punch press machine covering a separate unit from the machine illustrated in Figures 1 to 10, inclusive.

As shown on the drawings: The improved method of automatically producing corn plasters and depositing said corn plasters in rows upon strips of gauze is accomplished by a plurality of machine units positioned relative to one another to afford a convenient arrangement whereby the materials from which the corn plasters are to be produced may be subjected in proper sequence to the different machine units.

The material superimposing machine unit is illustrated in Figures 1 to 10, inclusive, and comprises a pair of parallel frame sills 1 supported on a plurality of legs or pedestals 2. Connecting the bottoms of the two frame sills 1 is a bottom or base plate 3 which extends from the discharge end of the machine to a position 4 near the other end of the machine as clearly illustrated in Figures 2 and 5. One end of the base plate 3 at the discharge end of the machine is cut away to afford a recess or notch 5 leaving a pair of arms 6 to the bottom of each of which a block 7 is secured. Each of the blocks 7 is provided with a transverse groove with said grooves aligned with respect to one another so that a material clamping bar or header 8 may be removably supported therein transversely across the discharge end of the machine. When the clamping bar 8 is supported in the blocks 7, pins 9 or other suitable means may be used for securing said bar in position as shown in Figure 9. As illustrated in Figure 10 the material clamping bar 8 is provided with a longitudinal groove 10 for removably receiving a clamping strip 11 therein. The clamping strip 11 is adapted to be held seated within the groove of the bar 8 by means of set screws or pins 12 or other suitable means. The purpose of the clamping bar will be hereinafter more fully described.

Secured on the inner side of each of the frame sills 1 is an angle rail 13. The rails 13 afford guides for a plurality of material carrying plates 14 which are adapted to be placed end to end in abutting relation upon the base plate 3 for receiving adhesived material. Each of the plates 14 is provided with a row of apertures 15 along each longitudinal margin of the plate as illustrated in Figure 4. At one end of the plate the corners are cut away to form notches 16. The plates 14 are adapted to be projected into position from the discharge end of the machine upon the base plate 3 and beneath the guide rails 13. The ends of the plates abut one another and said plates are adapted to push each other into the machine until the entire base plate 3 is covered.

Looking at Figure 1 the right hand end of the machine is the material feed end of the machine while the left hand end of the machine is the discharge end of the machine. Rigidly mounted on the rear side of the machine on the outer side of the frame sill 1 are a pair of spaced brackets 17 supporting bearings 18. Journalled in the bearings 18 is a driving shaft 19 having a bevel pinion 20 fixed on one end thereof. Loosely mounted on the shaft 19 between the brackets 17 are two driving pulleys 21 and 22 which are adapted to be rotated in opposite directions by means of driving belts connected to be driven from any suitable source of power. Carried on the shaft 19 between the pulleys 21 and 22 is a double-throw clutch represented as a whole by the reference numeral 23. Co-acting with the grooved collar or clutch 23 is a forked member or arm 24 having one end thereof secured to a shiftable rod 25 supported on the side of the machine frame. The control rod 25 governing the movement of the clutch 23 has one end thereof connected to one end of a stub shaft on the other end of which a control lever 26 is secured. The other end of the control rod 25 at the discharge end of the machine is adapted to be governed by a second manually controlled lever 34 which is fulcrumed on a support 35 on the side of the machine frame as illustrated in Figure 3. The lever 26 is adapted to be manually actuated to move the clutch 23 into a neutral position as shown in Figure 5 or into coacting relation with either one of the driving pulleys 21 or 22. Meshing with the bevel pinion 20 is a bevel pinion 27 which is secured on one end of a transverse shaft 28 journalled in suitable bearings 29 supported on the machine frame sills. Secured on the shaft 28 adjacent the outer side of one of the bearings 29 is a sprocket 30 around which an endless chain 31 is trained. The endless chain 31 extends practically the whole length of the machine and is also trained around a sprocket 32 which is rotatably mounted on the bracket 33 secured near one end of one of the frame sills 1 at the discharge end of the machine.

Mounted on the transverse shaft 28 to the outside of the sprocket 30 is a second sprocket around which an inclined endless chain 36 is trained. The inclined chain extends upwardly and is trained around an upper sprocket 37 supported on an upper stub shaft 38 on which a ratchet 39 is also supported. A pawl 40 co-acts with the ratchet 39. The upper stub shaft is provided for the purpose of removably receiving one of the trunnions of an upper winding up reel not shown. The upper stub shaft 38 is journalled in an upright bracket 42 secured on one side of the machine frame opposite the bracket 41. The second trunnion of the upper winding up reel is adapted to be removably supported in a suitable opening in the upper end of the vertical bracket or bar 41 secured on the side of the machine frame at the feeding end thereof.

Also secured on the transverse shaft 28 to the inside of the bevel pinion 27 is a third sprocket 43 around which a continuous driving chain 44 is trained. The chain 44 is disposed to the outside of the chain 36 and is also trained around a sprocket 45 mounted on the outer end of a lower stub shaft which is journalled in the lower portion of the bracket 42. The lower stub shaft is also equipped with a ratchet 39 having a pawl 40 co-acting therewith similar to the arrangement of the pawl and ratchet illustrated in Figure 6 in connection with the upper stub shaft 38. The lower stub shaft is adapted to have one of the trunnions of a lower winding up reel 46 removably engaged therewith while the other trunnion of the lower reel is adapted to be engaged in a suitable socket provided in the lower portion of the other bracket 41. Levers 47 are mounted on the side of the bracket 41 and are adapted to be operated to release the gauze winding up rolls or reels 46. Mounted on the frame sills 1 to one side of the bearings 29 are upright brackets 48 provided with upper and lower notches for the purpose of removably receiving the trunnions of upper and lower reels 49 carrying rolls of adhesived material 50 having the adhesived surface covered by gauze 51. Referring to Figure 1 the upper reel 49 is merely an auxiliary reel for holding the adhesived material in a position ready to be transferred to the lower reeling-off position when the lower reel of material has been exhausted.

With a roll of adhesived material covered with gauze positioned on the reel 49 as illustrated in Figure 6, one end of the gauze covering 51 is stripped from the material and fastened by any suitable means upon the core of a lower winding-up reel 46 supported in the lower position between the brackets 41 and 42. The end of the adhesived material 50 is engaged in the groove 10 of the drag-bar 8 and is held in position by means of the clamping strip 11 as clearly illustrated in Figure 9. With the adhesived material thus engaged in the bar 8, said bar is removably engaged in suitable notches or pockets 52 provided at one end of downwardly projecting portions of carriage side members 53. The side members or sills 53 of the carriage are connected to one another by means of transverse rods 54. Rotatably mounted on the outer side of each of the carriage sills 53 are side rollers 55 which track upon track plates 57 on the tops of the frame sills 1 (Figure 7). Secured on the bottom of each of the carriage side sills 53 are horizontally disposed bottom guide rolls 56 which are adapted to track against the inner surfaces of the frame sills 1 beneath the inwardly projecting edges of the track plates 57. As illustrated in Figures 7 and 8, each of the carriage side sills 53 has secured on one end thereof an upright retaining plate or bar 58 having apertured projections or lugs 59 integrally formed thereon to pivotally support a fulcrumed arm 60 in position thereon. The upper end of the arm 60 is curved and is separated from the upper end of the bar 58 by means of a spring 61 which serves to hold a pin 62 on the lower end of the arm 60 projected through an opening in the lower end of the bracket 58 for the purpose of holding the material clamping bar 8 secured in position on the carriage. A transverse bar 63 connects the curved upper ends of the arms 60. Pivotally mounted on the inner side of each of the carriage side sills 53 is a bar 64. The upper ends of the pivoted bars 64 are connected by a cross rod 65. Rotatably supported between the lower ends of the pivoted bars 64 is a presser roller 66 which normally is adapted to drop by gravity into the dotted line position of Figure 8. The presser roll 66 is adapted to be swung into the full line position of Figure 8 to seat in notches 67 provided in the carriage side sills 53. The presser roll is adapted to be manually moved into its release position by merely pressing downwardly on the cross bar 65 until the pivoted side bars 64 come into contact with the upper carriage cross bar 54 which serves as a stop for the pivoted bars 64.

Rigidly secured on one side near the rear end of one of the carriage side sills 53 is an upwardly projecting arm 68 having pins 69 engaged on the upper ends thereof adapted to project through openings in the chain 31 to permit said chain to advance the carriage over the machine frame and thereby cause the adhesived material from the roll 49 to be unwound or pulled over the plates 14 positioned upon the base plate 3 of the machine. The carriage 53 is adapted to be advanced over the machine sills 1 until a stop member 70 (Figure 1) is contacted at the discharge end of the machine.

The adhesived material applying machine illustrated and described in Figures 1 to 10, inclusive, is used for the purpose of applying two layers of the adhesived material upon the plates 14 with the adhesived surfaces down. A fragmentary portion of one of the plates 14 with two layers of material applied thereon is illustrated in Figure 24. The material applying operations will hereinafter be more fully described.

The corn plaster punching unit is illustrated in Figures 11 to 18, inclusive, and comprises a long bench or table comprising a pair of parallel side sills 71 connected by transverse brace bars or rods 72. The ends of the table sills 71 may be supported by legs or uprights. The middle portion of the table sills 71 project through a punch machine yoke 73 and are supported in said yoke upon a transverse die supporting plate 74. The punch yoke 73 is supported on a punch base or pedestal 75 as illustrated in Figure 11. Looking at Figure 13, the right hand end of the machine is the feeding end while the left hand end is the discharge end. Secured on the inner faces of the table sills 1 at the feed end of the machine are angle bars 76 on which a stationary table plate 77 is secured. The inner end of the table plate 77 is provided with a curved notch 78.

Rotatably journalled in suitable bearings on the table sills 71 adjacent the inner end of the stationary table plate 77 is a transverse shaft 79, the middle portion of which is journalled in a bracket 80 supported on the punch die plate 74. Secured on the shaft 79 adjacent the inner side of each of the table sills 71 is a plate feed sprocket 81 the teeth of which are adapted to co-act with the apertures 15 of the plates 14 to feed said plates into the punch machine. Mounted on one projecting end of the shaft 79 is a ratchet 82 with which a pawl 83 is engaged. The pawl 83 is mounted on one end of a fulcrumed arm 84 (Figure 11) which is pivotally supported on the shaft 79 between the ratchet 82 and the table sill 71. Connected to the other end of the fulcrumed arm 84 is the lower end of an eccentric rod 85. The upper end of the eccentric rod 85 is eccentrically connected with a gear 86 mounted on the inner face of a portion of the punch yoke 73 as illustrated in Figure 17. The gear 86 is in mesh with a gear 87 supported on a transverse shaft 88 journalled in suitable bearings provided for the purpose in the punch yoke 73. Secured on one projecting end of the transverse shaft 88 on the outside of the punch yoke 73 is a sprocket 89 having an endless driving chain 90 trained therearound. The driving chain 90 is also trained around a driving sprocket 91 rotatably supported upon one end of a punch operating drive shaft 92 supported in suitable bearings upon the upper portion of the punch yoke 73. Mounted on one end of the driving shaft 92 is a fly wheel 93 adapted to be driven by a belt from any suitable source of power to cause operation of the punch machine. Movably supported in the punch yoke 73 is a punch carrying ram 94 connected to be operated from the punch operating shaft 92 in a standard manner. Secured to the bottom face of the ram block 94 is a slotted plate 95 adapted to removably support punches 96 in position by means of a retaining strap or plate 97. The retaining strap 97 is bolted to the underside of the plate 95 as illustrated in Figures 11 and 12. Mounted on the die supporting plate 74 is a die block 98.

Mounted on the transverse shaft 88 within the punch yoke 73 is a sprocket 99 (Figure 12) around which an endless chain 100 is trained. The lower portion of the chain 100 is trained around a sprocket 101 supported on one end of a transverse shaft 102 journalled in suitable bearings 103 secured to the table sills 71. The transverse shaft 102 carries a drum or roll 104 (Figure 16) having a longitudinal row of picker pins or teeth 105 formed thereon. The picker pins on the roller 104 are adapted to pick out punched portions 106 (Figure 25) from the sheets of material as hereinafter more fully described.

For the purpose of feeding the plates 14 under the picker roller 104 a pair of sprockets 107 are supported on a transverse shaft 108 adjacent one edge of a transverse plate 109 supported on angle irons 110 secured to the inner sides of the table sills 71 (Figure 16). The transverse shaft 108 is journalled in suitable bearings supported on the table sills 71 and is adapted to be driven by a sprocket 111 secured on one projecting end of said shaft 108. The sprocket 111 has an endless chain 112 trained therearound to receive a drive from said chain. The chain 112 is also trained around a driving sprocket mounted on one projecting end of the transverse shaft 79 (Figure 13). Both shafts 79 and 108 are thus adapted to be simultaneously operated when the pawl 83 is actuated by the eccentric rod 85 to cause rotation of the ratchet 82 and shaft 79. Each of the plates 14 carrying superimposed layers of adhesived material 50 are adapted to have one end thereof positioned against a transverse placer or stop bar 113 connecting the ends of table sills 71 at the feeding end of the machine as illustrated in Figure 13. With one end of a plate 14 positioned against the stop bar 113, a plate 14 is adapted to be swung downwardly against the supporting plate 77 until the side edges of said plate are brought into contact with the downwardly curved or bevelled edges 114 of slidable retaining plates 115 (Figure 18). Said plates 115 are thus moved outwardly into a release position to permit the plate 14 to rest upon the plate 77 and upon angle brackets 116 secured to the inner sides of the table sills 71. As the plate 14 is put into position as described, each of the slidable retaining plates 115 is adapted to be automatically moved back into position by means of a spring 117. Each of the plates 115 moves inwardly until a stop member 118 on said plate comes into contact with a block 119 forming a part of the table sills 71.

With a plate 14 in position upon the supporting plate 77 and the angle brackets 116, the feed sprockets 81 are adapted to co-act with the apertures 15 of the plate 14 to advance the plate into the machine beneath guide plates 120 mounted upon the tops of the table sills 71. The plate 14 is thus advanced over the die block 98 and the transverse plate 109. After a punching operation, as hereinafter more fully described, the plate 14 is advanced into co-acting relation with the feed sprockets 107 on the shaft 108. The plate 14 is then moved onto inclined discharge angle rails 121 supported on the inner sides of the table sills 71. The plate is thus permitted to be slidably discharged from the machine, with the superimposed layers of adhesived material properly punched to form rows of corn plasters 122 as illustrated in Figure 28, and with the three layers of superimposed waste material 123 (Figure 28) still in position. The waste material 123 on each plate 14 as it is passed through the punch machine is manually stripped from the plate 14 by an operator, thus leaving the rows of corn plasters 122 in position on the plate 14 as shown in Figure 29.

The plates containing rows of corn plasters are now stacked in a convenient position ready to be transferred to a corn plaster stripping machine.

The corn plaster stripping machine unit is illustrated in Figures 19 to 23, inclusive, and comprises table or frame sills 124 supported on legs or uprights 125. The frame sills 124 are connected by means of transverse brace rods 126. Rigidly secured to the frame sills 124 near one end of the machine are two upright brackets 127, the upper ends of which are reduced in size to afford bars or rods 128 upon which drag weights 129 are slidably disposed. The drag weights 129 are adapted to frictionally contact the peripheral surfaces of a pair of end disks 130 formed on the ends of a cylindrical drum on which a roll of gauze 131 is carried. The shaft of the gauze drum or reel is supported on the brackets 127 thereby holding the gauze roll in position with the weights 129 frictionally contacting with the disks 130.

Also secured to the frame sills 124 to the inside of the gauze reel brackets 127 are a pair of oppositely disposed arms or brackets 132 on which is rotatably supported a corn plaster pad reel or drum 133 having end disks 134 forming a part thereof. One end of the shaft 135 of the reel 133 has a grooved pulley 136 secured thereon around which an endless belt 137 is trained. The endless belt 137 crosses itself and is also trained around a smaller drive pulley 138. The pulley wheel 138 is secured on one end of a lower shaft 139 on which a small gear 140 is also mounted adjacent the outer side of the machine frame. Mounted on the lower shaft 139 between the frame sills 124 is a lower rubber roll 141. The gear 140 meshes with an upper gear 142 (Figure 21) mounted on one end of an upper roller shaft 143. An upper rubber roll 144 is mounted on the upper shaft 143. The gear 142 is in mesh with a gear 145 supported on one projecting end of a cutter roll shaft 146. Supported on the cutter roll shaft 146 between the frame sills 124 is a cutter drum 147 which carries a plurality of spaced circular blades or knives 148. One end of a lower drive shaft 171 has a bevel gear 149 mounted thereon (Figure 19) which is in mesh with a bevel pinion 150 mounted on one end of a horizontal shaft 151 journalled in brackets 152 fixed on the outside of one of the frame sills 124. Secured on the shaft 151 is a pulley 153 around which a driving belt is adapted to be trained. The driving belt may be connected with any suitable source of power. Mounted on the shaft 151 adjacent the pulley 153 is a clutch mechanism 154 adapted to be controlled by means of a lever or handle 155 adapted to govern the transmitting of the drive from the pulley 153 to the bevel pinion 150.

Also meshing with the gear 145 is an upper gear 156 which is secured on one end of the shaft of an upper rubber roll 157 the shaft of which is journalled in the frame sills 124. Rotatably mounted on the machine frame below the upper rubber roller 157 is a lower rubber roller 158 on the shaft of which a lower gear 159 is secured with said gear 159 meshing with the upper gear 156 to receive a drive therefrom.

Secured on the extreme outer end of the cutter roll shaft 146 is a pinion 160. The pinion 160 is in mesh with a large gear 161 which is mounted on one end of the shaft 162 of a primary rubber roller 163. Also mounted upon the rubber roller shaft 162 to the inside of the large gear 161 is a gear 164. The gear 164 is in mesh with a gear 165 mounted on the shaft 166 of a steel guide roller 167. The shaft 166 is journalled in suitable bearings in the frame sills 124. Mounted on one projecting end of the drive shaft 171 is a gear 170 which meshes with a pinion 168. The pinion 168 drives the gear 140. Also journalled in the frame sills 124 is a second shaft 172. Each of the shafts 171 and 172 have sprockets 173 mounted thereon to the outside of the frame sills. The sprockets 173 have an endless chain 174 trained therearound to receive a drive from the shaft 171. Mounted on each of the shafts 171 and 172 adjacent the inner sides of each of the frame sills 124 are a pair of sprockets 175. The sprockets 175 are positioned to permit the teeth thereof to engage in the marginal openings 15 of the corn plaster carrying plates 14 as illustrated in Figure 20. The inner sides of the frame sills 124 have plate guides 176 secured thereto on which the corn plaster plates 14 are adapted to slide as they are fed into the machine. As hereinbefore described, each of the plates 14 has disposed thereon transverse rows of corn plasters or pads 122 with the adhesived sides being in contact with the plate. As clearly illustrated in the fragmentary showing in Figure 29 it will be seen that the corn plasters or pads 122 are arranged in rows both transversely and longitudinally of the plate.

The teeth of the sprockets 175 are adapted to engage in the plate openings 15, thereby causing a plate 14 to be fed into the machine over the steel guide roller 167 and beneath a transversely disposed pivotally mounted knife or stripping plate 177 (Figure 23). The pivoted stripping knife or plate 177 is controlled by means of a handle or lever 178 mounted on one side of the machine frame. Also mounted transversely of the machine frame directly below the rubber roller 163 is a transverse guide bar 179 around which the wide strip or band of gauze 180 is adapted to pass to permit the corn plasters or pads 122 when removed from the plate 14 by the knife mechanism to be transferred onto the gauze before the same passes between the two sets of rubber press rolls. As the corn plasters 122 are stripped from the plate 14, said plate is advanced over the second set of sprockets 175 on the shaft 171 and then is adapted to pass out of the lower part of the machine over a discharge bar or roll 181 mounted transversely below the machine frame sills on suitable brackets 182. As illustrated in Figure 20 the sheet of gauze 180 with the plasters engaged thereon in rows, is adapted to be cut in strips 183 (Figure 20) by the cutters 148 on the cutter roll 147. The individual strips of corn plasters 183 are adapted to be wound up upon the reel 133 to afford a plurality of adjacently disposed rolls 184 of corn plasters.

The operation is as follows: This invention relates more particularly to a method of manufacturing corn plasters in quantities and placing the manufactured corn plasters on strips of gauze ready for distribution. The invention furthermore relates not only to the method of manufacture of corn plasters but to a combination of machine units arranged to facilitate the manufacture of said corn plasters. As hereinbefore described, the invention comprises the combination of a material superimposing machine unit, a corn plaster punching unit and a corn plaster stripping machine unit with each of said units so positioned to afford a convenient arrangement whereby the corn plasters may be automatically produced.

Referring now to the material superimposing machine unit illustrated in Figures 1 to 10, inclusive, a roll or reel 49, of gauze covered adhesived material is rotatably supported upon the lower bearings of the upright brackets 48. If desired an upper reel 49 of gauze covered adhesived material may be removably supported in the upper bearings of the brackets 48 ready for use when the lower reel of material has been used. Referring now to Figure 6 the covered adhesived material from the lower reel 49 is unwound from said reel and one end of the gauze 51 is stripped from the adhesived material and is connected to the gauze winding-up reel 46 mounted in the lower bearings of the bracket arms 41 and 42. As illustrated in Figure 6 only one winding-up reel 46 is disclosed operable by means of the chain 44. If desired an upper winding-up reel 46 may be used operable by the chain 36 in case it is desired to feed two strips of the adhesived material into the machine at the same time. As already described the covered material from the reel 49 is separated to permit the gauze covering 51 to be connected with the winding-up reel 46 while the end of the adhesived material 50 is secured within the grooved clamping bar 8 and is held in position by means of the clamping strip 11. The material feed carriage 53 is moved into its extreme right hand position looking at Figure 1 ready to receive the clamping bar 8 engaged in the notches 52 as illustrated in Figure 8. The clamping bar 8 is removably held in position by means of the pins 62 on the spring controlled arms 60.

With the adhesived material connected to the clamping bar 8 which is mounted in the carriage 53 and with the gauze covering connected to the winding-up reel 46, a plurality of plates 14 (Figure 4) are placed upon the base plate 3 with the ends of said plates abutting one another until the entire base plate is covered with a row of plates 14. The plates are adapted to be received from the discharge end of the machine with one plate pushing the other into position until the advanced edge of the first plate registers with the end 4 of the base plate 3. The machine may now be started by shifting the clutch 23 into co-acting relation with the pulley 22 (Figure 5) to cause a drive to be transmitted to the bevel gears 20 and 27 and to the shaft 28. The carriage operating chain 31 is thus set in operation and having the pins 69 of the carriage bracket 68 engaged therewith, said carriage 53 is advanced from the feed end of the machine toward the discharge end thereof. When the carriage is advanced, the presser roll 66 on the pivoted arm 64 is raised into its full line position as illustrated in Figure 8 so that the adhesived material 50 is advanced over the longitudinal row of plates 14 as the rolling-up reel 46 is operated by the chain 44 to cause the covering gauze 51 to be stripped or pulled off of the adhesived material 50 as said material is unwound from the reel 49. It will thus be seen that the gauze covering is wound up on the reel 46 while the material is being drawn through the machine above the plates 14. When the carriage 53 reaches the stop 70, the operator actuates the control lever 26 to shift the clutch 23 into neutral position to stop the machine. The attendant now removes the clamping bar 8 from the carriage and releases the end of the adhesived material from said clamping bar. The lever 26 is now operated to shift the clutch 23 into co-acting relation with the driving pulley 21 thereby causing a reverse operation of the carriage feed chain 31 to advance the carriage from the discharge end of the machine, toward the feeding end of said machine. With the return of the carriage, the presser roll 66 drops by gravity into the dotted line position of Figure 8, thereby causing the adhesived material to be stretched and pressed into contacting relation with the row of abutting plates 14. When the carriage reaches its innermost position near the feeding end of the machine the machine is stopped and an attendant cuts the sheet of material transversely along the edge 4 of the base plate 3. The end of the adhesived material leading from the feed reel 49 is now again engaged in the clamping bar 8 and said clamping bar inserted back in position in the carriage 53. The machine is again started to cause the carriage to advance the material over the first layer of material while the presser roll is held in its elevated position as the carriage again advances through the machine. It will thus be seen that a second layer of adhesived material is drawn through the machine above the first layer until the carriage again reaches the stop 70. The clamping bar 8 is again removed from the carriage and the material released and the end removed from said clamping bar after which the machine is reversed, thereby causing retraction of the carriage 53. With the return movement of the carriage the presser roll 66 drops by gravity into the dotted line position of Figure 8, thereby causing the second layer of adhesived material to be rolled over the first layer of the material on the plates 14. When the carriage reaches its starting position the operator cuts the strip of adhesived material leading from the feed reel 49 after the machine has been stopped.

It will now be noted that the row of plates 14 in the machine are covered with two layers of adhesived material as illustrated in Figure 24 with the adhesived surfaces of said material being directed downwardly. The plates 14 covered with two layers of the adhesived material are now pulled out of the discharge end of the machine and as each plate is removed an attendant cuts the two layers of adhesived material transversely at the end of each plate.

Each plate 14 having two superimposed layers of adhesived material thereon is now adapted to be transferred to the punching unit illustrated in Figures 11 to 18 inclusive. One end of a plate 14 is positioned against the transverse stop bar 113 (Figure 13) after which the plate is swung downwardly to rest upon the stationary table plate 77 to permit the teeth of the feed sprockets 81 to coact with the apertures 15 of said plate 14. The punching unit is now set in operation. The eccentric rod 85 receives its drive through the meshing gears 86 and 87 (Figure 17) and causes operation of the fulcrumed arm 84 whereby the pawl 83 is adapted to actuate the ratchet 82 (Figure 11) to cause rotation of the plate feed shaft 79. The sprockets 81, co-acting with the plate 14 act to feed said plate into the punch machine over the die block 98 and beneath the punches 96. With each descending operation of the punches 96 a transverse row of oval punches 106 are cut or punched out of the superimposed layers of the material on the plate 14. The punches 96 are set to punch the material 50 only, and do not cut into the plate 14. With the continued operation of the pawl and ratchet mechanism illustrated in Figure 11, the plate 14 is intermittently moved into the field of operation of the punches 96 so that a plurality of transverse rows of the punched out portions 106 are punched in the superimposed layers of material as illustrated in Figure 25. The plate 14 is thus gradually advanced through the punch unit and passes through the field of operation of the picker roll 104 which carries a row of teeth 105. With each revolution of the picker roll 104, the teeth 105 are adapted to engage the punched out portions 106 of the material to pick or release said portions from the superimposed layers of material. After the plate carrying the punched material is advanced through the field of operation of the picker roll, said plate is fed toward discharge position by the sprockets 107 on the shaft 108 so that the plate is gradually fed onto the discharge rails 121 (Figure 13). When the plate reaches the discharge rails 121, an operator manually brushes the picked out portions or oval disks 106 from the punched layers of material, thereby leaving the plate 14 with the two layers of superimposed material thereon with rows of substantially oval apertures 106ª in said material as illustrated in detail in Figure 26. The plate with the superimposed layers of apertured material thereon is now removed from the discharge end of the punch machine unit and is ready to be returned to the material superimposing machine unit so that a third layer of the adhesived material may be applied upon each of said plates 14 above the two apertured or punched layers of material.

The plates carrying the two superimposed layers of punched material after leaving the punch machine unit, are returned to the material superimposing machine unit and are placed in abutting relation upon the base plate 3.

The adhesived material from the material feed roll 51 is again connected in the clamping bar 8 after which said bar is secured in position in the carriage 53. The control lever 26 is now operated to move the clutch 23 into co-acting relation with the drive pulley 22 to cause the carriage 53 to travel the length of the machine, pulling the adhesived material through the machine above the plates 14 while the gauze covering of said material is wound upon the winding-up reel 46. When the carriage reaches the stop 70 (Figure 1) the machine is stopped and the end of the adhesived material is released from the clamping bar 8. The control lever 26 is now operated to shift the clutch 23 into co-acting relation with the drive pulley 21, thereby causing the carriage to return to its normal position permitting the presser roll 66 to drop into the dotted line position of Figure 8 to cause the third layer of material to be pressed into position upon the two superimposed punched layers of material. When the carriage reaches its starting position the machine is stopped and an operator cuts the third adhesived layer of material transversely along the edge 4 of the base plate 3. The covered plates are again pulled out of the discharge end of the machine and the third layer of material is cut transversely at the point where the plates abut one another. The plates with the three layers of material thereon as shown in detail in Figure 27 are now adapted to be stacked one upon the other or transferred by any suitable means to the punch machine unit ready for another punching operation.

Each of the plates 14 with the three layers of material thereon is now again placed upon the plate 77 of the punch machine unit in a position to be fed into the machine by means of the feed sprockets 81. Before the punch machine is started for the second operation about to be described, the punches 96 are removed and a new set of punches of a slightly larger size are slipped into the punch block of the punch machine. The machine is now set in operation and the plate 14 with the three layers of superimposed material thereon is gradually fed into the machine by means of the pawl 83 and the ratchet 82 which are operated from the machine through the eccentric rod 85. As the plate is advanced into the field of operation of the punches the punches act to punch out transverse rows of corn plasters 122 as clearly illustrated in detail in Figure 28.

At the time the punches are changed the drive to the picker roll 104 is disconnected so that each of the plates 14 after having the three layers of the material thereon punched to produce the corn plasters 122, is permitted to be fed through the machine by the sprockets 107 onto the inclined discharge rails 121. At this stage of the cycle of operations an attendant at the discharge end of the punch machine unit takes hold of the three superimposed layers of waste material 123 (Figure 28) and manually pulls the same from each of said plates 14, leaving the corn plasters 122 disposed in transverse and longitudinal rows upon each plate 14 as illustrated in Figure 29. The plates 14 with the rows of corn plasters 122 disposed thereon are now stacked up and are ready to be transferred to the corn plaster stripping machine unit illustrated in Figures 19 to 23, inclusive.

The plates carrying the rows of corn plasters 122 are now delivered to the stripping machine and are successively placed upon the guide bars or rails 176 in a position to permit one end of each of said plates to have the apertures 15 thereof engage a set of the feed sprockets 175.

The operation of the stripping machine is controlled by means of the lever 155 which governs the clutch 154 controlling the drive through the pulley 153. When the clutch is thrown in, the shaft 151 is rotated, thereby causing the pinion 150 to rotate the bevel gear 149 and the lower shaft 171. A drive is thus transmitted by the gear 170 to the drum 147 and the disk cutters or knives 148 supported thereon. The drive to the cutter drum is transmitted by means of the gear 145 to the gear 156, thereby causing rotation of the upper rubber roller 144. The lower rollers 141 and 158 are driven through the gears 140 and 159 meshing respectively with the gears 142 and 156. The gear 160 on the end of the cutter shaft 146 causes a drive to be transmitted to the large gear 161 to cause rotation of the primary rubber roller 163. From the large gear 161 the drive is transmitted by means of the gears 164 and 165 to the steel guide roller 167.

With the machine in operation as above described a plate of corn plasters is placed upon the guide rails 176 and pushed into engagement with the first set of feed sprockets 175. The plate is fed into the machine over the steel guide roller 167 and beneath the stripper blade 177 (Figure 23). The position of the stripper blade 177 is controlled by means of the control lever 178 which may be operated to tip the stripper blade downwardly into an inclined position to scrape the upper surfaces of each plate 14 as it is advanced. With the stripper blade 177 lowered as described and with the plate 14 moving into the machine, the inclined stripper blade 177 acts to scrape or strip the transverse rows of corn plasters or pads 122 from the advancing plate. The drive from the machine is transmitted to the reel or roll 133 by means of an endless crossed belt 137.

A roll of gauze 131 is engaged on the gauze reel between the gauze reel disks 130 which in turn are frictionally contacted by the friction blocks 129. The blocks 129 control the unwinding of the roll of gauze 131. Gauze from the gauze roll is conducted into the machine and moves in a direction opposite to that of the movement of the plates 14 through the machine. From the reel 130 the gauze is conducted beneath the transverse guide bar 179 and then passes upwardly (Figure 23) between said bar and the primary roller 163. The gauze now passes between the first pair of presser rolls 157 and 158, and is then conducted into the field of operation of the knives 148 before passing between the second set of rubber rollers 141 and 144.

As the gauze is advanced over the transverse bar 179 a transverse row of corn plasters 122 is removed from the advancing plate 14 by means of the stripper blade 177. The removed strip of corn plasters comes into contact with the advancing gauze with the adhesived sides of the corn plasters contacting said gauze. The primary roller 163 acts to press the corn plasters against the gauze which is backed by the transverse bar 179. The rows of corn plasters are thus transferred from the plates 14 to the moving gauze 180 and are pressed tightly into engagement with said gauze by means of the first set of presser rolls 157 and 158. After passing through the first set of presser rollers the gauze is brought into the field of operation of revolving knives 148 which act to cut the large band of gauze into a plurality of narrow strips of gauze 183 (Figure 20). It will thus be seen that a plurality of strips of gauze 183 are cut by the machine, with each of said strips having a longitudinal row of corn plasters 122 disposed thereon. The corn plaster strips 183 are adapted to pass between the second set of presser rolls 141 and 144 which further act to press the corn plasters upon the gauze after which said individual strips are rolled upon the revolving reel 133 between the end disks 134 to form the individual rolls of corn plasters 184. The rolls of corn plasters 184 may be wound to any desired diameter depending upon the quantity of corn plasters desired in each roll. When the diameters of the rolls 184 are of the required size the gauze strips 183 are cut transversely, thereby permitting the winding-up reel 133 to be removed from the machine to permit removal of the individual rolls 184 therefrom. The rolls of corn plasters 184 are removed from the reel 133 and may be placed in large or small cartons ready for storage or shipment. If desired the individual rolls 184 may be separated and placed in small packages or cartons for sales purposes.

It will thus be seen that the stripping machine unit is adapted to automatically remove rows of corn plasters from the plates 14, transfer the plasters from said plates onto a moving band of gauze, after which the corn plasters are pressed into position to adhere to the gauze. The gauze with the rows of corn plasters thereon is next cut into a plurality of individual strips and the individual strips are simultaneously wound upon a receiving drum or reel ready to be removed and packed in boxes or cartons as desired.

The various machine units hereinbefore described are adapted to be used in a predetermined order to facilitate the production of corn plasters in large quantities by following the improved method hereinbefore described. One of the machine units is adapted to serve as a means for superimposing layers of the adhesived material on plates, while the punch machine unit is adapted to act at intervals to punch said layers of superimposed materials to cut corn plasters from the material, after which an operator is permitted to pull the waste material from the plates, leaving rows of the corn plasters on said plates, said corn plasters being adapted to be automatically removed from said plates by the third or stripping machine unit which acts not only to transfer the corn plasters from said plates onto a moving strip of gauze, but also acts to cut said moving strip of gauze into a plurality of narrow strips, each containing a longitudinal row of the finished corn plasters.

I am aware that many changes may be made and numerous details of construction may be varied through a wide range without departing from the principles of this invention, and I therefore do not purpose limiting the patent granted hereon, otherwise than necessitated by the prior art, and while I have herein referred to the disclosure as a machine or system for making corn plasters and for the purpose of clear claim drafting I have used the same expressions in the claims, I wish it to be distinctly understood that I have used these words in a descriptive sense only, and not as words of limitation as it is manifest that I am entitled to exclusive appropriation of any use for which the aforesaid machine, system or mode of procedure is adapted.

I claim as my invention:

1. The method of producing corn plasters consisting of applying layers of adhesived material in superimposed relation on stationary plates, punching the material and picking out the punched parts, then applying an additional layer of adhesived material on the punched layers of material on said plates after which the layers of material are again punched to produce corn plasters on said plates, stripping the waste material from said plates and leaving the corn plasters thereon, and finally stripping the corn plasters from said plates and feeding the same onto a moving strip of gauze.

2. The method of producing corn plasters consisting of superimposing layers of adhesived material on plates, punching the material to cause corn plasters to be punched from the layers of material, removing the waste material from said plates and leaving the corn plasters thereon, then transferring the corn plasters from said plates onto a moving strip of gauze after which the strip of gauze with the corn plasters thereon is cut into a plurality of narrower strips which are wound into rolls.

3. The method of producing corn plasters in quantities consisting of applying layers of adhesived material to stationary plates, then punching the layers of material and automatically removing the punched out portions, then applying another layer of material to the punched layers and again punching all the layers of material to produce corn plasters on said plates, removing the waste material from said plates, leaving the corn plasters, then transferring the corn plasters from said plates to a moving strip of gauze, cutting said strip of gauze into a plurality of narrower strips, each containing a row of corn plasters and finally winding up said narrow strips of gauze to form rolls of corn plasters.

4. The method of producing corn plasters consisting of first applying two layers of adhesived material to a stationary plate, then punching out portions of said material and picking out the punched portions, then applying a third layer of material above the two punched layers and again punching the three layers of material to cut corn plasters from said layers of material, then stripping the waste material from said plate leaving the rows of corn plasters thereon, then removing the corn plasters in rows from said plate and transferring the same onto a moving strip of gauze, cutting the strip of gauze into narrower strips, each containing a row of said corn plasters, and then winding said narrower strips of gauze with the corn plasters thereon to form rolls of corn plasters.

5. The method of producing corn plasters in quantities consisting of applying layers of adhesived material to a plate at spaced intervals, punching said layers of material at spaced intervals to produce rows of corn plasters on said plate, then stripping rows of corn plasters from said plate and transferring the same to a moving strip of gauze and pressing said corn plasters on said strip of gauze as the strip is cut into narrower strips and rolled into rolls.

6. The method of producing rolls of corn plasters consisting of first applying layers of adhesived material to a plate, then punching the layers of material on said plate and picking out the punched out portions, applying another layer of adhesived material to the punched layers and again punching the layers of material to produce rows of corn plasters on said plate, next pulling the waste material from said plate leaving the rows of corn plasters, then scraping the corn plasters from said plate and transferring the same to a moving strip of gauze, and finally pressing said corn plasters on said strip of gauze as the strip is cut into narrower strips which are wound into rolls.

7. The method of producing corn plasters consisting of applying two layers of adhesived material to a plate, then punching out rows of oval disks from said material and picking out said disks, then applying a third layer of adhesived material above the punched out layers after which the third layer of material on said plate together with the first two layers are again punched to have rows of corn plasters punched from the three layers of material, then pulling the waste material from said plate, leaving the corn plasters in position, then stripping the corn plasters from said plate while moving and transferring and pressing the corn plasters upon a moving strip of gauze as said strip of gauze is cut into narrower strips and wound into rolls.

8. The method of producing corn plasters consisting of alternately applying and punching layers of material on a plate to permit rows of corn plasters to be punched from the material prior to the removal of the waste material from said plate, and then removing the corn plasters from the plate while moving and transferring the corn plasters onto a moving material as said material is cut into narrower strips and wound into rolls.

In testimony whereof I have hereunto subscribed my name.

OTTO G. SCHMITT.